United States Patent [19]

Omitsu

[11] Patent Number: 4,699,025
[45] Date of Patent: Oct. 13, 1987

[54] METHOD AND APPARATUS FOR CONTROLLING A POWER DELIVERY SYSTEM HAVING A CONTINUOUSLY VARIABLE RATIO TRANSMISSION

[75] Inventor: Takashi Omitsu, Davis, Calif.

[73] Assignee: Aisin Seiki Kabushiki Kaisha, Japan

[21] Appl. No.: 781,502

[22] Filed: Sep. 30, 1985

[51] Int. Cl.⁴ .......................................... B60K 41/16
[52] U.S. Cl. ..................................... 74/866; 74/877; 364/431.09
[58] Field of Search ....................... 364/424.1, 431.09; 74/866, 865, 877

[56] References Cited

U.S. PATENT DOCUMENTS

| | | | |
|---|---|---|---|
| 4,107,776 | 8/1978 | Beale | 74/866 X |
| 4,220,059 | 9/1980 | Mizuno et al. | 74/865 |
| 4,438,664 | 3/1984 | Fiala | 74/866 |
| 4,458,560 | 7/1984 | Frank et al. | 74/865 X |
| 4,458,561 | 7/1984 | Frank | 74/865 |
| 4,459,878 | 7/1984 | Frank | 74/866 X |
| 4,515,041 | 5/1985 | Frank et al. | 74/866 |
| 4,541,052 | 9/1985 | McCulloch | 364/424.1 X |
| 4,569,254 | 2/1986 | Itoh et al. | 74/866 |

Primary Examiner—Leslie Braun
Assistant Examiner—Dwight G. Diehl
Attorney, Agent, or Firm—Banner, Birch, McKie & Beckett

[57] ABSTRACT

A control system and method for a power delivery system, such as in an automotive vehicle, having an engine coupled to a continuously variable ratio transmission (CVT). Totally independent control of engine and transmission enable the engine to precisely follow a desired operating characteristic, such as the ideal operating line for low fuel consuption. CVT ratio is controlled as a function of commanded desired system performance (e.g., power or torque) and measured actual system performance, such as CVT torque output, while engine fuel requirements (e.g., throttle position) are strictly a function of measured engine speed. Fuel requirements are therefore precisely adjusted in accordance with the ideal characteristics for any load placed on the engine. Appropriate controls prevent anomalous engine and vehicle behavior, and allow for transient start-up from test. The lag between a commanded change in torque or power of the power delivery system and the time the commanded torque is actually produced in also shortened.

9 Claims, 8 Drawing Figures

METHOD AND APPARATUS FOR CONTROLLING A POWER DELIVERY SYSTEM HAVING A CONTINUOUSLY VARIABLE RATIO TRANSMISSION

BACKGROUND OF THE INVENTION

This invention relates to an improvement in the control of power delivery systems having a continuously variable ratio transmission such as might be used in an automotive vehicle. More particularly, the present invention is directed to a method and apparatus for shortening the time lag between a commanded change in torque output or power of the power delivery system and the time the commanded torque is actually produced.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and a driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

Figure 1:
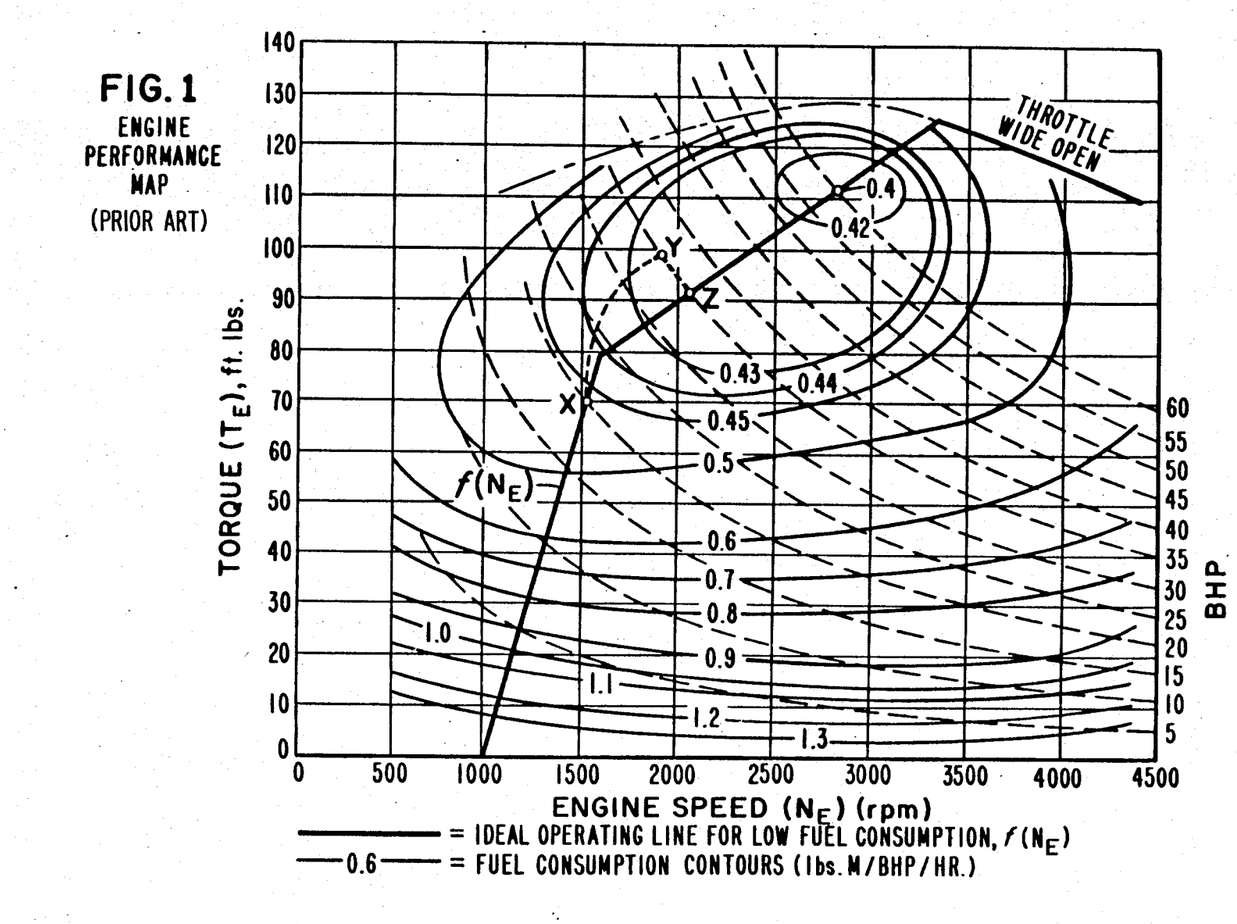
FIG. 1 is the performance map of a typical four cylinder passenger car engine having a displacement of approximately 2.5 liters.

FIG. 1 is a typical performance map of a four cylinder spark ignition passenger car engine having a displacement of approximately 2.5 liters. The map is a plot of engine torque $T_E$ and brake horsepower $B_{HP}$ as a function of engine speed $N_E$. The dot-dash line near the top of the map is a plot of engine torque at full throttle. The series of curves in solid black lines are fuel consumption contours, indicating constant brake specific fuel consumption (BSFC) IN lb.M/BHP-hr. Minimum fuel consumption occurs at a point designed by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating line for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most of the time at high BSFC values. In contrast, a CVT is able to vary its speed ratio continously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line.

In virtually all prior art engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As point out earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most prior art control systems cannot compensate for varying engine conditions, the result being vehicle drivability which varies with engine temperature, state of tune, age and altitude. Close duplication of conventional vehicle characteristics also is a problem with prior art CVT control schemes.

The above noted disadvantages and deficiencies of prior art CVT control schemes were overcome by the control system and method disclosed in commonly assigned U.S. Pat. Nos. 4,515,041, 4,459,878 and 4,458,560, all of which are incorporated herein by reference. These patents disclose that engine operation can readily be maintained along the ideal operating line by providing for totally independent engine and transmission control. That is, the position of the engine throttle is totally independent of accelerator pedal position. Throttle position and, hence, engine output torque simply is a function of engine speed only, and that function may be any desired relationship, for example, the ideal operating line for low fuel consumption, the ideal operating line for low emissions, or a compromise ideal operating line for low fuel consumption and low emissions. Torque, power or other desired performance parameters commanded by the accelerator pedal controls CVT ratio, and engine speed is determined by the load placed thereon, which is a function of road load and CVT ratio. Hence, throttle position is precisely adjusted in accordance with the ideal function for any load placed on the engine. With the control system and method disclosed in the prior applications, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission.

For convenience, the control system and method disclosed in the prior applications and the improvement therein provided by the present invention, is described throughout in the context of an engine-CVT propulsion system for an automotive vehicle. It should be understood, however, that the principles disclosed are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carbureted spark-ignition engine wherein fuel flow varies with throttle butterfly position, a fuel injected spark-ignition or diesel engine, a gas turbine, and so on.

Figure 2:
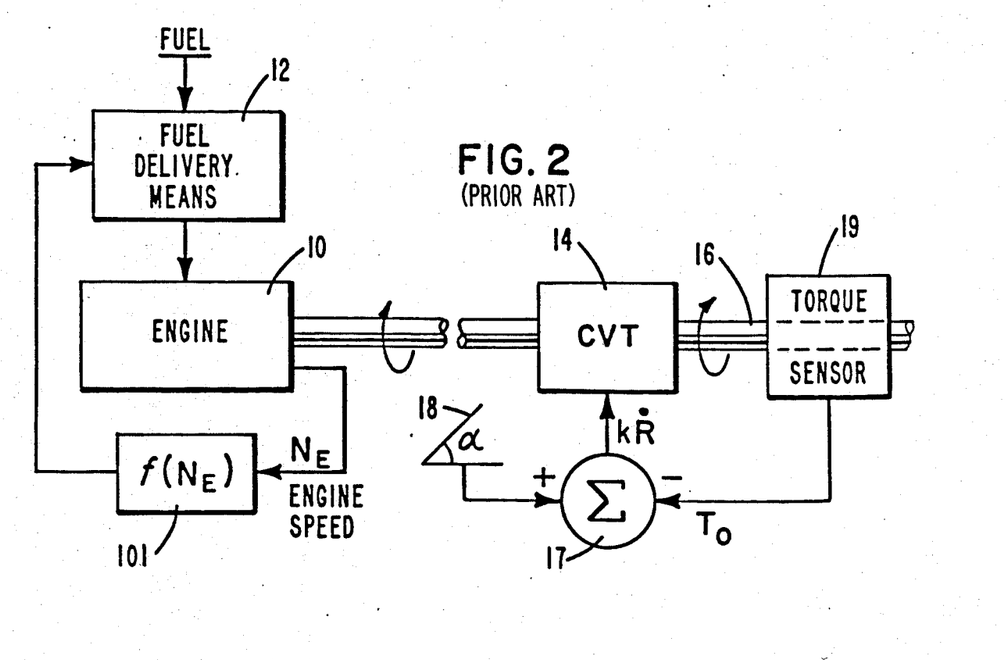
FIG. 2 is a schematic illustration showing the functional relationships of the components of an engine-CVT control scheme disclosed in U.S. Pat. Nos. 4,459,878 and 4,458,560.
Figure 3:
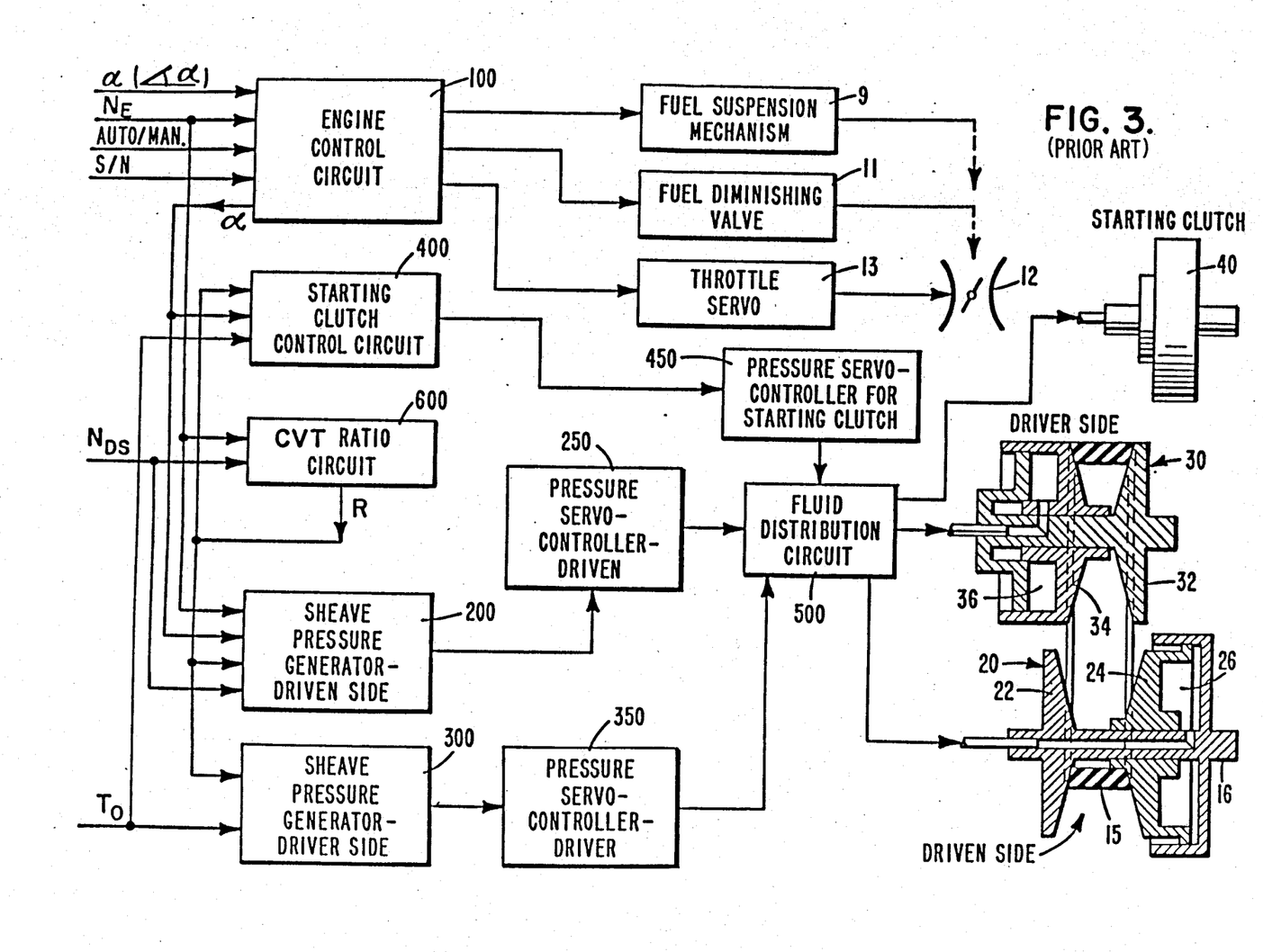
FIG. 3 is a schematic illustration showing the entire control system of FIG. 2 and its relationship to the CVT sheave and belt drive, and the vehicle starting clutch.

Referring to FIGS. 2 and 3, the basic control system disclosed in the above patents applications will now be discussed. FIG. 2 illustrates the functional relationship of the components used to implement the control system. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 mya be one of the many types of continuously variable ratio transmissions discussed above. Output shaft 16 delivers power and torque from the engine and CVT. The ratio of the CVT is set by a CVT ratio controller 17, which generates a rate of change of ratio signal kR as a function of output torque $T_O$ measured by torque sensor 19 and commanded power or torque commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft accelerator, or other parameters could be used. In the control system shown in FIG. 2, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption, the ideal operating line for low emissions, a compromise of the two, or any other desired engine operating characteristics.

FIG. 3 schematically illustrates the entire control system in greater detail. The particular type of CVT illustrated in FIG. 3 is the variable diameter pulley, V-belt traction drive type having a driven sheave 20 connected to output shaft 16 and a driver sheave 30 which is coupled to engine 10. Belt 15 interconnects sheaves 20 and 30 to transmit motive power therebetween. Sheaves 20 and 30 are hydraulically actuated by pressurized fluid to vary the driving diameters. Sheave 20 has an axially fixed portion 22 and an axially movable portion 24. Pressurized fluid in a fluid chamber 26 behind movable portion 24 provides the axial force required to maintain portions 22 and 24 at a fixed distance from one another (i.e., to hold the driving diameter of sheave 20 constant), and to move portion 24 toward or away from portion 22 to vary the driving diameter. Similarly, sheave 30 has an axially fixed portion 32 and a movable portion 34 which is under the influence of fluid pressure in chamber 36. Proper pressures in chambers 26 and 36 to keep belt 15 under proper tension are maintained by the control system, as described below.

The position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic or manual mode, and a start/neutral switch (S/N) which insures that the vehicle will remain stationary when the engine is started.

Fluid pressure for activating the driven sheave is provided by a sheave pressure generator 200 which acts through a pressure servo controller 250 and a fluid distribution circuit 500. Similarly, fluid pressure for activating the driver sheave 30 is provided by sheave pressure generator 300 acting through a servo controller 350 and fluid distribution circuit 500. Pressure generator 200 is responsive to inputs of engine speed $N_E$, accelerator position $\alpha$, drive shaft speed $N_{DS}$ measured by a sensor associated with drive shaft 16, and CVT ratio R. Ratio R is generated by CVT ratio circuit 600 and is the quotient of engine speed $N_E$ divided by drive shaft speed NDS.

A starting clutch 40 is provided which couples engine 10 and CVT 14. Clutch 40 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, engine speed $N_E$ and the auto/manual switch, through servo controller 450 and fluid distribution circuit 500.

Though the above method and apparatus represents a substantial improvement over CVT control schemes known in the prior art, it has been found that the responsiveness of the vehicle to driver commands can be greatly improved. In the above control schemes, engine output torque can only be changed by changing engine speed. Engine speed, however, can only be changed by changing the ratio of the CVT. Accordingly, it takes a relatively long period of time to reflect a commanded change in engine output torque. This is especially so at low engine speeds. Moreover, when there is a commanded change in output torque at low engine speeds, the steep slope along the ideal operating line for the engine tends to accelerate the engine to a higher speed than the driver desires.

SUMMARY OF THE INVENTION

It is therefore the overall object of the present invention to overcome the above-noted disadvantages and deficiencies in earlier control systems for a power delivery system having a continously variable ratio transmission.

It is a specific object of the present invention to provide a method and apparatus for shortening the time lag between a commanded change in torque output or power of the power delivery system and the time the commanded torque is actually produced.

It is a further specific object of the present invention to provide an improved system for controlling a power delivery system for a CVT having the above features which is economical to manufacture and easy to install.

It is a still further specific object of the present invention to provide an improved system for controlling a power delivery system for a CVT having the above features which provides more accurate control of the CVT.

These and other advantages of the CVT control system of the present invention are achieved by initially providing more direct control by the accelerator pedal over engine throttle opening when a commanded change in engine torque or power occurs. It has been found that for small commanded changes in engine torque, the engine continues to operate near the ideal operating line. Thus, little loss in engine efficiency results.

To avoid confusion with the fuel diminishing system disclosed in the above-mentioned pending applications, the corresponding system of the present invention will be referred to hereafter as a fuel cut or fuel cutting system.

BRIEF DESCRIPTION OF THE DRAWINGS

The novel features of the present invention are set forth with particularity in the appended claims, but the invention will be understood more fully and clearly from the following detailed description of the invention as set forth in the accompanying drawings, in which:

DETAILED DESCRIPTION OF THE PREFERRED EMBODIMENT

Figure 4:
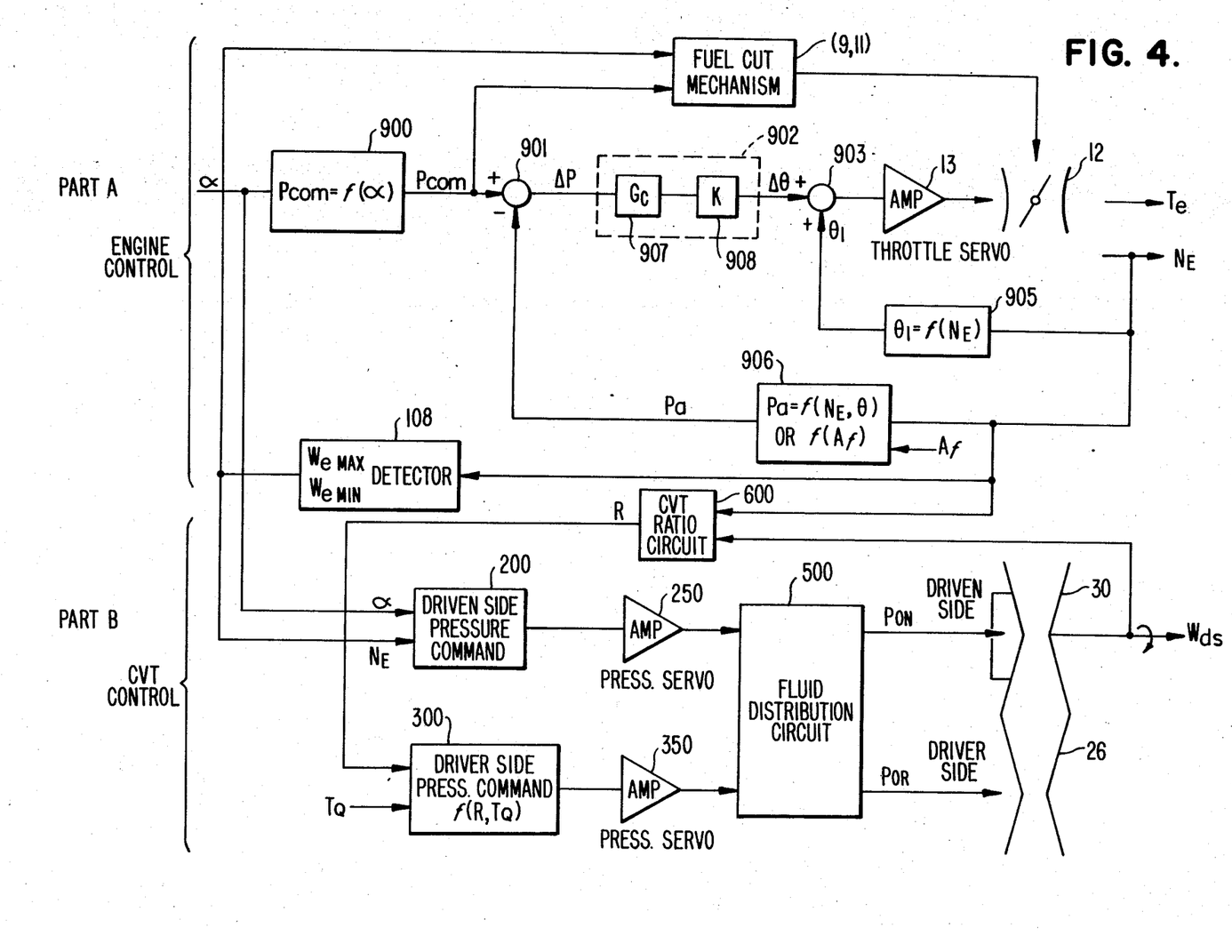
FIG. 4 is a schematic illustration showing the control system of FIG. 2 as modified in accordance with the present invention.

The improved method and apparatus for controlling a power delivery with a CVT in accordance with the present invention will be described with reference to FIG. 4. As can be seen, the control system of the present invention is a modification of the control system shown in FIG. 2. Corresponding elements in both systems have like reference numbers. FIG. 4 is also divided into parts A and B. Part A illustrates the components which control the engine and part B illustrates the components which control the CVT. As shown in FIG. 4, a $\alpha$ signal representing accelerator pedal position, or a signal from another command means is coupled to commanded power controller 900. Power controller 900 uses a function of accelerator pedal position ($f(\alpha)$) to determined commanded power Pcom. Pcom is combined with the actual power output of the engine Pa in controller 901 to provide a change in power signal $\Delta P$. Signal $\Delta P$ is coupled to variable gain compensator 902 which converts the change in power $\Delta P$ to a change in engine throttle opening signal $\Delta \theta$. Signal $\Delta \theta$ is combined in controller 903 with signal $\theta_1$ which represents the throttle opening which would maintain the engine along the ideal operating line as shown in FIG. 1. The output signal ($\Delta \theta + \theta_1$) is then used to control throttle servo amplifier 13 to adjust the opening of engine throttle 12.

As can be seen in FIG. 4, two feedback paths are provided in the engine control portion of the system. The first path is represented by block 905 which determines the throttle opening which would maintain the engine along the ideal operating line as a function of engine speed $N_E$. The second feedback path is represented by block 906 which determines actual engine power Pa as a function of engine speed $N_E$ or mass air flow through the engine ($Af$).

The CVT control shown in part B of FIG. 4 functions as above described in accordance with FIG. 2.

The operation of the control system of the present invention will now be described with reference to the graph shown in FIG. 5 where line 1 is the ideal operating line for the engine and lines $b_1$–$b_7$ are engine power output levels. Assuming that at a point A on the ideal operating line, there is a change in accelerator pedal position commanding a power increase. When this occurs, the required change in throttle opening is calculated and the throttle opens according to, for example point B on the graph. Since $\Delta \theta$ is added to $\theta$, the throttle open wider than necessary to maintain the engine on the ideal operating line. This situation, however, allows for a more rapid increase in power output as shown by the graph. Note that at point B on engine power curve b6, the power output of the engine is greater than at point C where curve b6 crosses the ideal operating line for the engine. Thus, the engine produced the commanded power output almost immediately. The actual location of point B on the graph is determined by variable gain compensator 902 shown in FIG. 4.

Variation gain compensator 902 includes lead compensator 907 and gain control 908. Lead compensator 907 modifies by a predetermined function such as:

$$\text{Function 1: } G_c = 5.06 \frac{s + 2.22}{s + 11.24}$$

where s is a laplase function. Function 1 of lead compensator 907 improves the transient response of the engine when the accelerator pedal position is changed quickly. During steady state operation of the engine, there will be no $\Delta\theta$ because any small $\Delta P$ is disregarded by function 1 of lead compensator 907 when the accelerator pedal position is changed slowly. Therefore, during steady state operation, the engine is controlled only by signal $\theta_1$.

Figure 5:
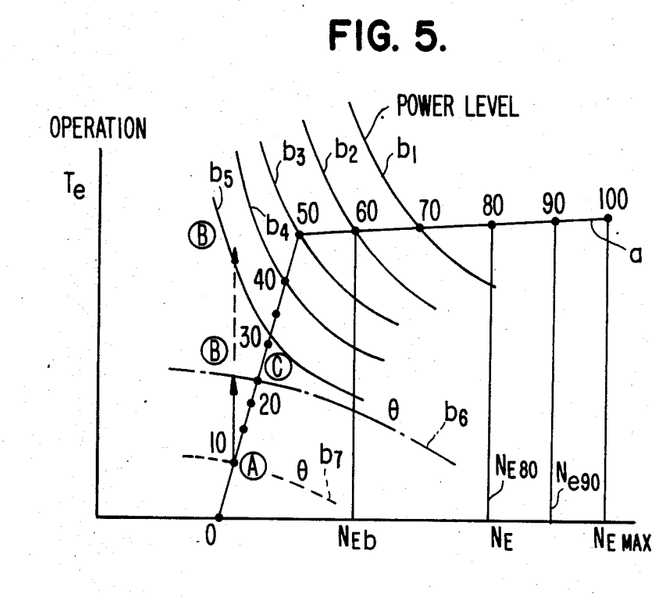
FIGS. 5-8 are engine performance graphs showing the performance of an engine at various throttle openings.

Gain control 908 can be adjusted so that the location of point B on the graph shown in FIG. 5 can be optimized for a particular vehicle or power delivery system.

Figure 6:
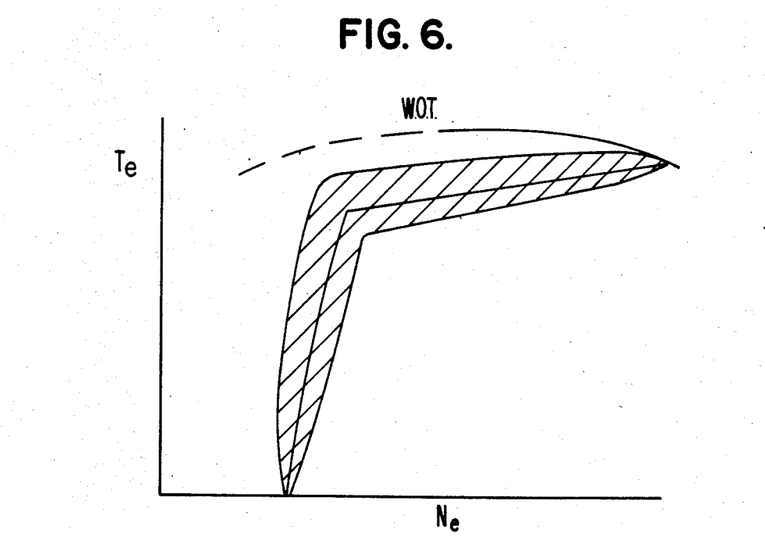
Figure 7:
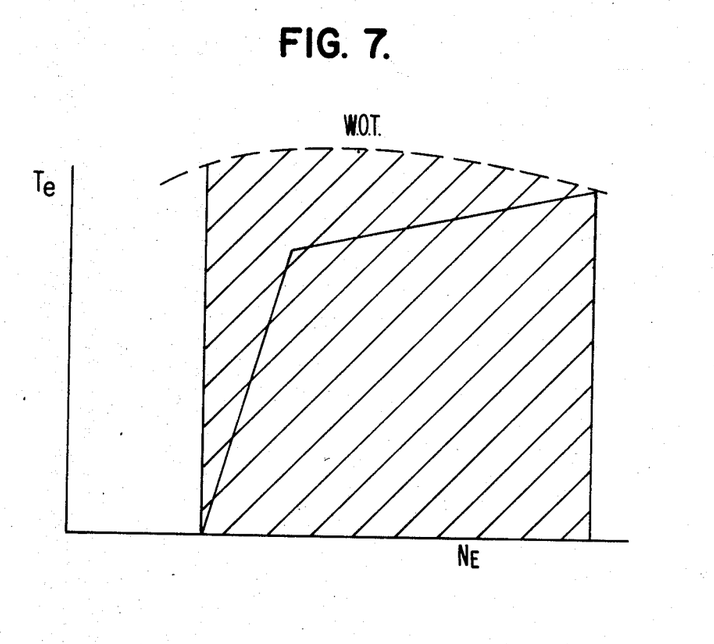

It has also been found that when Function 1 is used, there is no need for the Pa feedback path shown in FIG. 4. It has also been found that for a small change in $\Delta\theta$, the engine can continue to operate cloase to the ideal operating line by a selected gain value of gain control 908 as shown by the shaded area in FIG. 6. It is also possible that the operation of the engine as shown by the shaded area in FIG. 7 is due to a selected gain value of gain control 908.

In the prior CVT control systems, the acceleration pedal directly controlled the throttle opening until the CVT clutch engaged. When this occurred, the engine was immediately forced to operate along the ideal operating line, with a resulting surge in engine torque.

Figure 8:
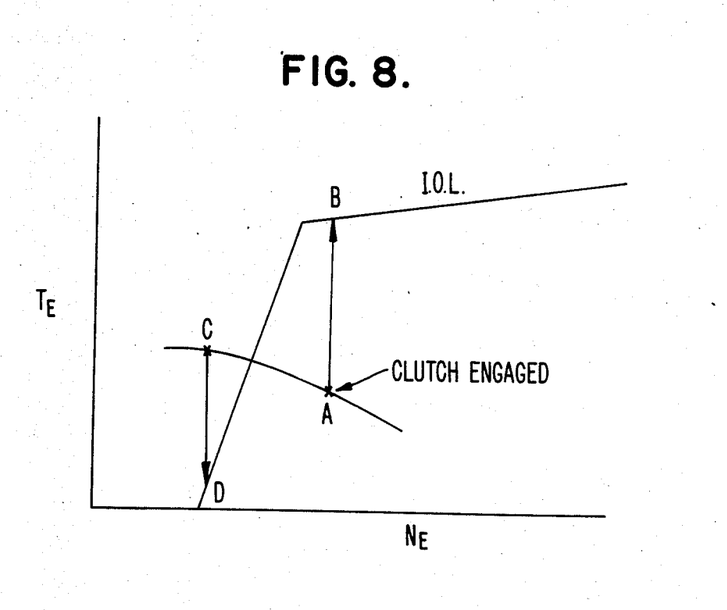

With reference to FIG. 8, for example, if the clutch engages at point A, engine throttle would immediately open to point B. On the other hand, if clutch engagement occurs while the engine was operating at point C, the throttle would open forcing the engine to operate at point D. In either situation, there would be a sudden change in engine torque which would be felt by the vehicle driver. This situation can be avoided with the improved CVT control system of the present invention since the engine throttle can be adjusted to control engine torque. Thus at the transition point to CVT operation, engine torque can be controlled to eliminate a sudden change in torque. With the present invention, the throttle can be adjusted even while in the CVT mode.

This invention has been described in detail in connection with the preferred embodiments, but the preferred embodiments are an example only and this invention is not restricted thereto. It will be easily understood by those skilled in the art that other variations and modifications can be easily made within the scope of the invention.

I claim:

1. A system for controlling the operation of a power delivery system including an engine and a continuously variable ratio transmission coupled to said engine for delivering power from said engine to an output shaft, said engine having fuel delivery means for delivering a variable quantity of fuel thereto, said power delivery system being controlled by command means for commanding a desired power delivery system performance, wherein said engine is maintained along an ideal operating line as a function of engine speed, said system comprising:

actual system performance measuring means for measuring the actual performance of the power delivery system;

ratio control means operatively coupled to said command means and said actual system performance measuring means for controlling the ratio of said transmission as a function of the desired system performance commanded by said command means and the measured actual system performance, the speed of said engine varying as a function of transmission ratio;

command power controller means for providing a signal representing accelerator pedal position; and control means coupled to said command power controller means which includes compensating means for providing a compensating signal as a function of said signal representing accelerator pedal position, said compensating means includes a compensator and a gain controller and wherein the fuel delivered to said engine by said fuel delivery means is dependent on said compensating signal.

2. The system of claim 1 wherein said actual performance of said power delivery system is a function of the speed of said engine.

3. The system of claim 1 further including fuel function means defining a desired fuel requirement for said engine in relation to engine operating speed.

4. The system of claim 3 wherein said signal is modified in accordance with said fuel function means to control said delivery means.

5. The system of claim 1 wherein said commanded system performance is modified in accordance with a predetermined function.

6. The system of claim 1 wherein said control means is coupled to said actual system performance measuring means.

7. The system of claim 1 wherein said fuel delivery means includes an engine throttle valve.

8. A system for controlling the operation of a power delivery system including an engine and a continuously variable ratio transmission coupled to said engine for delivering power from said engine to an output shaft, said engine having fuel delivery means for delivering a variable quantity of fuel thereto, said power delivery system being controlled by command means for commanding a desired power delivery system performance, said system comprising:

power command signal means included within said command means for providing a power command signal;

commanded power control means coupled to said command means for receiving said power command means signal and providing a commanded power signal, said commanded power signal being a function of said power command signal;

actual system measuring means for measuring the actual performance of said power delivery system and providing a system performance signal ;

power change means coupled to said commanded power control means and said actual system measuring means for receiving said commanded power signal and said system performance signal and providing a power change signal;

conversion means coupled to said power change means for converting said power change signal to a fuel delivery means control signal for controlling said fuel delivery means; and compensating means coupled to said commanded power control means for providing a compensating signal as a function of said power command signal, said compensating means includes a compensator and a gain controller wherein the fuel delivered to said engine by said fuel delivery means is dependent on said compensating signal.

9. The system of claim 8 further including ideal fuel delivery control means for determining the ideal operation of said fuel delivery means to maintain the operation of said engine along an ideal operating line and providing a corresponding ideal fuel delivery means control signal, wherein said conversion means adds said fuel delivery means control signal to said ideal fuel delivery means control signal to control said fuel delivery means.

* * * * *